(12) United States Patent
Ono et al.

(10) Patent No.: US 8,529,826 B2
(45) Date of Patent: Sep. 10, 2013

(54) MANUFACTURING METHOD OF HONEYCOMB STRUCTURE

(75) Inventors: Yohei Ono, Kiyosu (JP); Yasushi Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 403 days.

(21) Appl. No.: 12/400,508

(22) Filed: Mar. 9, 2009

(65) Prior Publication Data

US 2009/0243167 A1    Oct. 1, 2009

(30) Foreign Application Priority Data

Mar. 31, 2008  (JP) ................................ 2008-089353

(51) Int. Cl.
*C04B 33/32*   (2006.01)

(52) U.S. Cl.
USPC .......................................................... 264/631

(58) Field of Classification Search
USPC .................................................. 264/630, 631
See application file for complete search history.

(56) References Cited

U.S. PATENT DOCUMENTS

| | | | |
|---|---|---|---|
| 3,514,842 A | | 6/1970 | Beuyukian et al. |
| 4,849,275 A | * | 7/1989 | Hamaguchi et al. .......... 428/116 |
| 4,869,944 A | | 9/1989 | Harada et al. |
| 4,877,670 A | | 10/1989 | Hamanaka |
| 5,030,398 A | | 7/1991 | Hamanaka et al. |
| 5,549,725 A | | 8/1996 | Kasai et al. |
| 5,938,992 A | * | 8/1999 | Hamanaka et al. .............. 264/43 |
| 2003/0166450 A1 | | 9/2003 | Kumazawa et al. |
| 2006/0035778 A1 | * | 2/2006 | Tomita .......................... 501/141 |
| 2006/0192324 A1 | | 8/2006 | Kaneda et al. |
| 2006/0192326 A1 | * | 8/2006 | Matsunaga et al. ........... 264/670 |
| 2006/0193756 A1 | | 8/2006 | Suzuki et al. |
| 2007/0243357 A1 | | 10/2007 | Ichikawa |

FOREIGN PATENT DOCUMENTS

| | | |
|---|---|---|
| EP | 1 238 741 A1 | 9/2002 |
| JP | A-63-40777 | 2/1988 |
| JP | B2-7-61892 | 2/1994 |
| JP | A-11-71188 | 3/1999 |
| JP | B2-2938740 | 8/1999 |
| JP | A-2003-40687 | 2/2003 |
| JP | A-2004-315346 | 11/2004 |
| JP | A-2007-290945 | 11/2007 |
| WO | WO 2005/063360 A1 | 7/2005 |

\* cited by examiner

*Primary Examiner* — Joseph S Del Sole
*Assistant Examiner* — Erin Snelting
(74) *Attorney, Agent, or Firm* — Oliff & Berridge, PLC

(57) ABSTRACT

There is provided a manufacturing method of a honeycomb structure, comprising: forming kneaded clay containing a cordierite forming raw material formed by mixing talc having an average particle diameter of 0.1 to 40 μm, kaolin having an average particle diameter of 0.1 to 20 μm, an alumina source raw material having an average particle diameter of 0.05 to 10 μm, and a silica having an average particle diameter of 0.1 to 20 μm, a binder, a surface active agent, water, and a hygroscopic resin having an average particle diameter of two to 200 μm after water absorption and a water absorption magnification of two to 100 magnifications into honeycomb shape to fabricate a honeycomb formed body; and firing the honeycomb formed body to obtain a honeycomb structure whose porosity is less than 40%.

5 Claims, No Drawings

MANUFACTURING METHOD OF HONEYCOMB STRUCTURE

BACKGROUND OF THE INVENTION

1. Field of the Invention

The present invention relates to a manufacturing method of a honeycomb structure. More particularly, it relates to a manufacturing method of a honeycomb structure that is superior in formability, has a high manufacturing efficiency, and can assure a stable porosity with respect to an obtained honeycomb structure and maintain a required strength.

2. Description of the Related Art

A honeycomb structure formed of cordierite having a low thermal expansion coefficient is used in order to adsorb/absorb, e.g., NOx, CO, or HC contained in an exhaust gas from an automobile by, e.g., a carried catalyst. As such a honeycomb structure, one having pores (air holes) formed in a partition wall is usually utilized to carry, e.g., a catalyst. As a method of forming the pores, there is disclosed a method of blending a pore forming agent consisting of solid particles or hollow particles in a forming raw material and burning off the pore forming agent to form the pores when firing a formed body (see, e.g., Patent Documents 1 to 3). Further, a method using a hygroscopic resin as the pore forming agent is disclosed (see, e.g., Patent Documents 4 and 5). Furthermore, a method of manufacturing a honeycomb structure having pores in a partition wall without using a pore forming agent is disclosed (see, e.g., Patent Documents 6 and 7).

[Patent Document 1] Japanese Patent No. 2938740
[Patent Document 2] JP-A-2003-40687
[Patent Document 3] JP-A-2004-315346
[Patent Document 4] A brochure of International Publication No. WO2005/63360
[Patent Document 5] JP-A-11-71188
[Patent Document 6] JP-B-7-61892
[Patent Document 7] JP-A-63-40777

Each of the inventions disclosed in Patent Documents 1 to 3 is a manufacturing method of a porous ceramics structure that obtains a honeycomb formed body by extrusion forming and then fires this formed body to acquire a honeycomb structure, and it uses solid-core or hollow flammable particles as a pore forming agent and forms air holes when the particles are burnt off at the time of firing. However, when the solid particles are used as the pore forming agent, since each of the particles has a solid core, there can be obtained an advantage that these particles are hard to be crushed at the time of mixing/kneading a forming raw material and a stable porosity can be obtained. However, there is a problem that a die for extrusion forming is clogged with these particles and a defect, e.g., a crack in a partition wall occurs in the formed body. Furthermore, there is also a problem that an extrusion pressure is increased and the die for extrusion forming is deformed. Moreover, since these particles have a high calorific value at the time of firing, there is a problem that a failure, e.g., a crack due to a thermal stress or an internal defect often occurs. On the other hand, when hollow particles are used as the pore forming agent, since the particles are hollow and have a low calorific value at the time of firing, occurrence of the above-explained defect can be suppressed. However, since the particles are apt to be crushed at the time of mixing/kneading/forming a raw material, there arises a problem that a stable porosity cannot be assured and filter characteristics are degraded.

The invention disclosed in Patent Document 4 is a manufacturing method of a honeycomb structure that subjects a forming raw material containing a hygroscopic resin blended therein as a pore forming agent to extrusion forming to obtain a honeycomb formed body and then fires this formed body to acquire a honeycomb structure. This method can reduce a pressure required at the time of forming in particular and suppress a defect or deformation, and is superior in a yield ratio. However, it has a problem that a honeycomb structure having a porosity of 40% or above alone can be obtained. In particular, a thin-walled honeycomb used for emission gas purification in an automobile has a problem that a strength is reduced when the porosity is 40% or above.

The invention according to Patent Document 5 obtains a pellet type formed body based on extrusion forming, then granulates this formed body to acquire a spherical formed body, and dries and fires this spherical formed body to obtain a porous body. Since this invention performs granulation after extrusion forming, it has an advantage that product characteristics do not vary depending on a defect at the time of extrusion forming (formability at the time of extrusion forming). The invention disclosed in Patent Document 5 does not concern the manufacturing method of a honeycomb structure. However, in a case where this manufacturing method is applied to a honeycomb formed body, this invention has not only a problem that a drying time is prolonged when a water absorption magnification of a hygroscopic resin exceeds 100 magnifications since a formed body formed into a honeycombs structure contains a large amount of water but also a problem that a large amount of power for drying is required to increase a cost for drying. Additionally, this invention also has a problem that deformation readily occurs and a yield ratio is apt to be lowered since a hardness degree of the formed body having the honeycomb structure is reduced or a crack at the time of drying is increased. Further, this invention also has a problem that a stable porosity cannot be assured and filter characteristics are degraded since a gel strength is lowered and a hygroscopic resin is apt to be crushed during forming.

The inventions disclosed in Patent Document 6 and 7 are methods of manufacturing a porous honeycomb structure without using a pore forming agent. These methods have a problem that fluidity of a forming raw material in extrusion forming is low and formability is poor as compared with the manufacturing method using a hygroscopic resin as the pore forming agent. Further, these methods do not have a conception of using the hygroscopic resin as a forming auxiliary agent for the purpose of improving formability. Therefore, a grain size of a cordierite forming raw material required to maintain a strength necessary as a honeycomb structure while using the hygroscopic resin is not examined at all in these method.

SUMMARY OF THE INVENTION

In view of the above-explained problems in a conventional technology, it is an object of the present invention to provide a manufacturing method of a honeycomb structure that is superior in formability, has a high manufacturing efficiency, and can assure a stable porosity with respect to an obtained honeycomb structure and maintain a necessary strength.

The present invention provides the following manufacturing method of a honeycomb structure.

[1] A manufacturing method of a honeycomb structure, comprising: forming kneaded clay containing a cordierite forming raw material that contains talc having an average particle diameter of 0.1 to 40 μm, kaolin having an average particle diameter of 0.1 to 20 μm, and an alumina source raw material having an average particle diameter of 0.05 to 10 μm, a binder, a surface active agent, water, and a hygroscopic resin having an average particle diameter of two to 200 μm after water absorption and a water absorption magnification of two to 100 magnifications into honeycomb shape to obtain a honeycomb formed body; and firing the honeycomb formed body to obtain a honeycomb structure whose porosity is less than 40%.

[2] The manufacturing method of a honeycomb structure according to [1], wherein the kneaded clay contains 0.01 to 20 parts by weight of the hygroscopic resin with respect to 100 parts by weight of the cordierite forming raw material.

[3] The manufacturing method of a honeycomb structure according to [1] or [2], wherein a thickness of a partition wall in the honeycomb structure is 35 to 260 μm.

[4] The manufacturing method of a honeycomb structure according to any one of [1] to [3], wherein the average particle diameter of the hygroscopic resin after water absorption is equal to or below 90% of the thickness of the partition wall in the honeycomb structure.

[5] The manufacturing method of a honeycomb structure according to any one of [1] to [4], wherein the average particle diameter of the hygroscopic resin after water absorption is 0.1 to 20-fold of an average particle diameter of at least one of components in the cordierite forming raw material having average particle diameters exceeding 10 μm.

[6] The manufacturing method of a honeycomb structure according to any one of [1] to [5], wherein the cordierite forming raw material further contains a silica having an average particle diameter of 0.1 to 20 μm.

According to the manufacturing method of a honeycomb structure of the present invention, since an average particle diameter of, e.g., talc forming a cordierite forming raw material is set to fall within a predetermined range, a hygroscopic resin is used as a forming auxiliary agent, an average particle diameter of the hygroscopic resin after water absorption is set to two to 200 μm, and a water absorption magnification is set to two to 100 magnifications, whereby a honeycomb structure having a porosity that is less than 40% can be obtained. Since the porosity of the resultant honeycomb structure is less than 40%, the strength required for the honeycomb structure can be maintained. Furthermore, since the hygroscopic resin is used, (1) the hygroscopic resin is not lodged at the time of extrusion forming because of elasticity of the hygroscopic resin after water absorption, and (2) water holding properties of kneaded clay are thereby increased and lubricity in extrusion forming is improved. Therefore, formability becomes excellent, and a stable porosity can be assured since the hygroscopic resin is not crushed in mixing of the cordierite forming raw material and extrusion forming. Moreover, since the water absorption magnification of the hygroscopic resin is equal to or below 100 magnifications, a drying time can be reduced. Additionally, since the water absorption magnification is equal to or below 100 magnifications, a crack at the time of drying is not increased, and a reduction in yield due to, e.g., modification of the resultant honeycomb structure can be suppressed, thus improving a manufacturing efficiency.

DETAILED DESCRIPTION OF THE PREFERRED EMBODIMENTS

Although the embodiments for carrying out the present invention will now be specifically explained hereinafter, the present invention is not restricted to the following embodiments, and it should be understood that the design is appropriately changed or improved based on normal knowledge of persons skilled in the art without departing from the scope of the present invention.

According to an embodiment of a manufacturing method of a honeycomb structure of the present invention, a kneaded clay containing a cordierite forming raw material including talc having an average particle diameter of 0.1 to 40 μm, kaolin having an average particle diameter of 0.1 to 20 μm, and an alumina source raw material having an average particle diameter of 0.05 to 10 μm, a binder, a surface active agent, water, and a hygroscopic resin having an average particle diameter of two to 200 μm after water absorption and a water absorption magnification of two to 100 magnifications is molded into a honeycomb shape to fabricate a honeycomb formed body, and the honeycomb formed body is fired to obtain a honeycomb structure whose porosity is less than 40%. Here, the honeycomb structure is a cylindrical structure having a porous partition wall that partitions a plurality of cells.

(Kneaded Clay)

According to an embodiment of the manufacturing method of a honeycomb structure of the present invention, the cordierite forming raw material, the binder, the surface active agent, water, and the hygroscopic resin are first mixed and kneaded to form the kneaded clay. The cordierite forming raw material means a raw material that is turned to cordierite based on firing, and it is a ceramics raw material in which predetermine raw materials are mixed to provide a chemical composition containing 42 to 56 weight % of a silica ($SiO_2$), 30 to 45 weight % of an alumina ($Al_2O_3$), and 12 to 16 weight % of a magnesia (MgO) In this embodiment, the "predetermined raw materials" to be blended are talc having an average particle diameter of 0.1 to 40 μm, kaolin having an average particle diameter of 0.1 to 20 μm, and the alumina source raw material having an average particle diameter of 0.05 to 10 μm. Further, as a cordierite forming raw material (the predetermined raw materials), a silica having an average particle diameter of 0.1 to 20 μm may be contained. When the silica is contained, there can be obtained an advantage that a porosity can be adjusted. When the average particle diameter of talc, kaolin, the alumina source raw material, or the silica (when the silica is contained) is smaller than a lower limit value of each of the above-explained ranges, raw material particles are agglomerated, a die for extrusion forming is clogged with these particles, and a defect, e.g., a partition wall crack occurs in a formed body, which is not preferable. Further, an extrusion pressure is increased, and the die for extrusion is deformed, which is not preferable. When the average particle diameter of talc, kaolin, the alumina source raw material, or the silica (when the silica is contained) is higher than an upper limit value of each of the above-explained ranges, a porosity of the obtained honeycomb structure becomes equal to or above 40%, which is not preferable. It is further preferable for the cordierite forming raw material to contain talc having an average particle diameter of one to 30 μm, or three to 15 μm, or five to 15 μm and kaolin having an average particle diameter of 0.5 to 10 μm or one to 10 μm, the alumina source raw material having an average particle diameter of 0.1 to 10 μm or 1.1 to 10 μm, and the silica having an average particle diameter of 0.5 to 15 μm or one to 10 μm. It is most preferable to mix talc having an average particle diameter of five to 15 μm, kaolin having an average particle diameter of one to 10 μm, the alumina source raw material having an average particle diameter of 0.1 to 10 μm, and the silica having an average particle diameter of one to 10 μm. The average particle diameter means a median size that is measured based on a laser diffraction method using a laser diffraction/scattering grain size distribution measuring device LA-910 manufactured by Horiba Ltd. It is to be noted that the alumina source raw material means a raw material such as an aluminum oxide or an aluminum hydroxide that is oxidized based on firing to form a part of cordierite.

The hygroscopic resin has an average particle diameter of two to 200 μm after water absorption and a water absorption magnification of two to 100 magnifications. Since the average particle diameter after water absorption falls within such a range, the hygroscopic resin has an advantage that kneaded clay using this resin is superior in formability and a stable porosity can be assured with respect to a resultant honeycomb structure. When the average particle diameter of the hygroscopic resin after water absorption is smaller than two μm, a desired formability improving effect cannot be obtained, which is not desirable. When the average particle diameter of the same is larger than 200 μm, although the hygroscopic resin after water absorption has elasticity, clogging is apt to occur if a slit of a die for extrusion forming is narrow, which is not desirable. The average particle diameter of the hygroscopic resin after water absorption is two to 200 μm, and a range of 10 to 100 μm is preferable. Further, when the water absorption magnification of the hygroscopic resin is smaller than two magnifications, elasticity of the hygroscopic resin after water absorption becomes insufficient, which is not preferable. When the same is larger than 100 magnifications, a time required to dry a honeycomb formed body after extrusion forming becomes long, and a problem of a reduction in manufacturing efficiency occurs. Furthermore, an amount of water in the honeycomb formed body is increased, and a problem of a reduction in hardness of the honeycomb formed body arises. Moreover, when the water absorption magnification of the hygroscopic resin exceeds 100 magnifications, a crack at the time of drying is increased to cause, e.g., deformation of a honeycomb structure due to a large amount of water that is removed during drying, and a yield ratio is thereby decreased, resulting in a problem of a reduction in manufacturing efficiency. The water absorption magnification of the hygroscopic resin is two to 100 magnifications, and a range of 10 to 50 magnifications is preferable.

It is preferable for the average particle diameter of the hygroscopic resin after water absorption to be equal to or below 90% of a thickness of a partition wall in a resultant honeycomb structure, more preferable for the same to fall within the range of two % to 75%, and particularly preferable for the same to be five to 60%. When the average particle diameter of the hygroscopic resin after water absorption is set to be equal to or below 90% of the thickness of the partition wall, an advantage of contributing to assuring a strength required for the honeycomb structure can be obtained. When this average particle diameter exceeds 90%, rough and large pores are apt to be formed with respect to the thickness of the partition wall after firing the honeycomb formed body, and a strength may become insufficient in some cases. When the average particle diameter of the hygroscopic resin after water absorption is set to fall within the range of two % to 75% of the thickness of the partition wall in the obtained honeycomb structure, the balance of the average particle diameter and a flow path width (a slit width of the die for extrusion forming) of the kneaded clay at the time of extrusion forming becomes optimum, and hence cordierite forming raw material particles and the hygroscopic resin can be present together in the slit width in a dispersed state. Therefore, lubrication of a flow of the raw material particles can be enhanced, and formability when forming the honeycomb formed body based on extrusion forming can be improved.

Additionally, it is preferable for the average particle diameter of the hygroscopic resin after water absorption to be 0.1 to 20-fold of an average particle diameter of at least one of components in the cordierite forming raw material having average particle diameters exceeding 10 μm, and more preferable to be 0.5 to 10-fold of the same. Further, it is preferable for the average particle diameter of the hygroscopic resin after water absorption to be 0.1 to 20-fold of the average particle diameters of all the cordierite forming raw material components in the cordierite forming raw material having the average particle diameters exceeding 10 μm, and particularly preferable for the same to be 0.5 to 10-fold of the same. The "average particle diameter of at least one of components in the cordierite forming raw material having average particle diameters exceeding 10 μm" means an average particle diameter obtained by excluding raw material types having average particle diameters equal to or below 10 μm and measuring at least one of the respective cordierite forming raw material components having the average particle diameters exceeding 10 μm. When the average particle diameter of the hygroscopic resin after water absorption to fall within such a range, the particle diameter balance of the hygroscopic resin and large-particle-diameter raw materials in the cordierite forming raw material that are apt to affect fluidity of the kneaded clay in the die for extrusion forming becomes excellent, and formability is further improved. When the average particle diameter of the hygroscopic resin after water absorption becomes less than 0.1-fold or exceeds 20-fold of all average particle diameters of raw materials exceeding the average particle diameter 10 μm in the cordierite forming raw material, the mutual particle diameter balance is degraded, and fluidity of the kneaded clay becomes insufficient, and formability is reduced.

Since the hygroscopic resin utilizes elasticity that is exercised by water absorption to pass through the slit or a screen that prevents mixing of rough and large particles with respect to the slit at the time of extrusion forming while being deformed, the die for extrusion forming is not clogged with this resin. Further, a calorific value at the time of firing is small, failures, e.g., occurrence of cracks can be reduced. Furthermore, since the hygroscopic resin is not crushed even if it receives a shared load, a pore forming ability is not degraded, and hence a fluctuation in porosity can be suppressed, thus assuring a stable porosity.

As the hygroscopic resin, specifically, it is possible to use a starch base, polyacrylic base, polyvinyl alcohol base, cellulose base, or a synthetic polymer base hygroscopic resin.

As a content of the hygroscopic resin in the kneaded clay, 0.01 to 20 parts by weight is preferable, or 0.05 to 15 parts by weight is more preferable, or 0.1 to 10 parts by weight is particularly preferable in a dried state with respect to 100 parts by weight of the cordierite forming raw material. Setting the content of the hygroscopic resin in the kneaded clay to fall within such a range enables further improving formability of the honeycomb formed body and also enables stably setting a porosity of the honeycomb structure to be less than 40%. When the content of the hygroscopic resin is set to be smaller than 0.01 part by weight with respect to 100 parts by weight of the cordierite forming material, the formability improving effect when subjecting the honeycomb formed body to extrusion forming may not be exercised in some cases. When the content of the hygroscopic resin is set to be larger than 20 parts by weight, the porosity of the honeycomb structure may be hardly adjusted to be less than 40% in some cases. When the hygroscopic resin is contained in the kneaded clay, plasticity of the kneaded clay is increased, and hence formability of the honeycomb formed body is improved. That is, water holding properties of the kneaded clay are improved, and an effect of enhancing lubricity in extrusion forming is produced.

In the manufacturing method of a honeycomb structure according to this embodiment, as the binder that is to be contained in the kneaded clay, there are, e.g., methyl cellulose, hydroxypropyl methylcellulose, hydroxyethyl cellulose, carboxymethyl cellulose, polyvinyl alcohol, and others. Each of these materials may be solely used, or two or more of these materials may be combined to be used.

In the manufacturing method of a honeycomb structure according to this embodiment, as the surface active that is to be contained in the kneaded clay, a surface active agent having anion properties, cation properties, non-ion properties, or both ion properties may be used. As the anionic surface active agent, there are, e.g., fatty acid salt, alkylsulfate ester salt, polyoxyethylene alkyl ether sulfate ester salt, polycarboxylic acid salt, polyacrylic acid salt, and others. Furthermore, as the non-ionic surface active agent, there are, e.g., polyoxyethylene alkyl ether, polyoxyethylene glycerin fatty acid ester, polyoxyethylene sorbitan (sorbitol) fatty acid ester, and others. The surface active agent has a function of improving dispersibility of raw material particles and facilitating orientation of raw material particles at the time of extrusion forming.

Moreover, in the manufacturing method of a honeycomb structure according to this embodiment, water is contained as a dispersion medium in the kneaded clay. It is preferable for an amount of water contained in the kneaded clay to be set to an amount enabling the kneaded clay to have appropriate hardness at the time of extrusion forming of a honeycomb formed body, and to have a part by weight that is equal to or above a value obtained by multiplying a mixed amount of the hygroscopic resin by its water absorption magnification (a mixed amount of the hygroscopic resin×the water absorption magnification) with respect to 100 parts by weight of the cordierite forming raw material including an amount of water absorbed by the hygroscopic resin.

In the manufacturing method of a honeycomb structure according to this embodiment, the method of mixing the cordierite forming raw material, the binder, the surface active agent, water, and the hygroscopic resin is not restricted in particular, and a known method can be used. For example, there is, e.g., a pre-mixing method. In particular, the hygroscopic resin may absorb water in advance (it can absorb water to a predetermined extent or absorb water until the water absorption magnification is met) and then mixed with the other raw materials, or may absorb water while being mixed with the other raw materials in a dried state, but the latter method is preferable since it simplifies manufacturing steps. Moreover, the method of kneading the mixture to form the kneaded clay is not restricted in particular, and a known method can be used. For example, a kneader or a vacuum clay kneader can be used to perform kneading.

(Forming)

Then, the obtained kneaded clay is molded into a honeycomb shape to fabricated a honeycomb formed body. It is preferable to fabricate the honeycomb formed body by subjecting the obtained kneaded clay to extrusion forming by using a die having a desired cell shape, a partition wall thickness, a cell density, and others and a non-sealed screen associated with this die. It is preferable that an extrusion pressure is not considerably increased in order to avoid deformation of the die for extrusion forming. It is preferable to fabricate the honeycomb formed body so that a honeycomb structure meeting later-explained conditions can be obtained when the honeycomb structure is formed based on firing.

(Drying)

Then, drying the obtained honeycomb formed body is preferable. The drying method is not restricted in particular, and a conventionally known method, e.g., hot-air drying, microwave drying, dielectric drying, drying under a reduced pressure, vacuum drying, or freeze dry can be adopted. Among others, a drying method combining hot-air drying with microwave drying or dielectric drying is preferable since the entire formed body can be rapidly and uniformly dried.

(Preliminary Firing)

Subsequently, performing preliminary firing before firing the honeycomb dried article is preferable. "Preliminary firing" means an operation of burning an organic matter (e.g., the binder or the hygroscopic resin) in the honeycomb dried article to be removed. In general, since a burning temperature for the binder (an organic binder) is approximately 100 to 300° C. and a burning temperature for the hygroscopic resin is approximately 200 to 800° C., a preliminary firing time is not restricted in particular when a preliminary firing temperature is set to approximately 200 to 1000° C., but it is usually approximately 10 to 100 hours.

(Firing)

Then, the honeycomb dried article is fired to fabricate a honeycomb structure. Based on firing, the ceramic raw material in the honeycomb dried article can be sintered to become dense, thereby assuring a predetermined strength. As firing conditions (a temperature, a time) of the cordierite forming raw material, it is preferable to perform firing at 1350 to 1440° C. for approximately three to 10 hours. Performing the preliminary firing and the firing at continuous manufacturing steps is preferable in terms of a temporal efficiency and an energy efficiency.

Although a shape of the honeycomb structure manufactured by the manufacturing method of a honeycomb structure according to the present invention is not restricted in particular, it can be, e.g., a cylindrical shape, a quadratic prism shape, a triangular prism shape, or any other prism shape.

Further, a cell shape of the honeycomb structure (a cell shape in a cross section vertical to a central axis direction (a direction along which cells are extended) of the honeycomb structure) is not restricted in particular, and it can be, e.g., a square shape, a hexagonal shape, or a triangular shape. Furthermore, this cell shape does not have to be a single cell shape in the honeycomb structure, and forming the honeycomb shape by combining a square shape with an octagonal shape is also a preferable conformation.

A porosity of a partition wall in the obtained honeycomb structure is less than 40% (volume %), a porosity that is equal to or above 15% and less than 40% is preferable, 20 to 39% is more preferable, and 22 to 38% is particularly preferable. When the porosity of the partition wall is set to be less than 40%, the strength of the honeycomb structure can be highly maintained. When the porosity of the partition wall is equal to or above 40%, the strength of the honeycomb structure is reduced, which is not preferable. On the other than, when the porosity is less than 15%, coatability of a catalyst becomes insufficient. It is to be noted that the porosity was calculated by measuring a total pore volume by a mercury porosimeter and using an absolute specific gravity of cordierite. The porosity of the partition wall can be set to be less than 40% by adjusting the average particle diameter of the cordierite forming raw material, the average particle diameter of the hygroscopic resin after water absorption, and the water absorption magnification of the hygroscopic resin as explained above in manufacture of the honeycomb structure.

As a thickness of the partition wall of the obtained honeycomb structure, a range of 35 to 260 μm is preferable, a range of 38 to 250 μm is more preferable, and a range of 40 to 240 μm is particularly preferable. When setting the thickness of the partition wall to fall within such ranges, a formability improving effect that is an object of this application can be obtained at maximum. When the thickness of the partition wall is smaller than 35 μm, the strength of the honeycomb structure may be reduced in some cases. When the thickness of the partition wall is larger than 260 μm, the manufacturing method of a honeycomb structure according to this embodiment can be applied. However, in such a case, a risk of clogging of the die for extrusion forming with the raw material particles is essentially small, whereby the effect is decreased. Additionally, increasing the thickness of the partition wall beyond necessity is not preferable since an increase in pressure loss, an increase in calorific capacity, an increase in carrier mass, and others occur. The thickness of the partition wall is a value measured by an image measuring device NEXIV manufactured by Nikon Corporation.

It is preferable for an average pore diameter of the partition wall in the resultant honeycomb structure to be two to 20 μm and more preferable for the same to be three to 15 μm. If there are too many pores having small pore diameters, the number of pores that are closed when, e.g., a catalyst is carried becomes extremely increased and a pressure loss is increased, which is not preferable. If there are too many pores having large pore diameters, the strength of the honeycomb structure is lowered, which is not preferable. As the average pore diameter, a value of a median pore diameter based on a volume obtained by the mercury porosimeter was adopted.

Although a cell density in the obtained honeycomb structure is not restricted in particular, a range of 15 to 240 cells/cm² is preferable, and a range of 45 to 190 cells/cm² is more preferable.

It is preferable for the partition wall in the resultant honeycomb structure to carry a catalyst. As the catalyst to be carried, there is, e.g., a ternary catalyst, an oxidation catalyst, an NOx trap catalyst, or an SCR catalyst.

The manufacturing method of a honeycomb structure according to the present invention can be applied to manufacture of, e.g., a catalyst coating carrier that is not sealed or a DPF. In particular, a thickness of a partition wall is generally often large in the DPF, whereas a thickness of a partition wall is generally small (a slit width of a die for extrusion forming is small) in a honeycomb structure that is used as the catalyst coating carrier which is not sealed. Therefore, when the present invention is applied to manufacture of the catalyst coating carrier that is not sealed, a more considerable formability improving effect can be obtained.

EXAMPLES

Although the present invention will now be more specifically explained hereinafter based on examples, the present invention is not restricted to these examples.

Example 1

As a cordierite forming raw material, a material obtained by mixing talc having an average particle diameter of 10 μm, kaolin having an average particle diameter of six μm, an aluminum oxide ($Al_2O_3$) (an alumina source raw material) having an average particle diameter of two μm, and a silica having an average particle diameter of four μm to provide 40 weight % of talc, 40 weight % of kaolin, 19 weight % of the aluminum oxide, and one weight % of the silica was used. 33 parts by weight of water as a dispersion medium, 0.01 part by weight of a hygroscopic resin in a dried state, five parts by weight of methyl cellulose as a binder, and 0.5 part by weight of a lauric potassic soap as a surface active agent were respectively added to 100 parts by weight of the cordierite raw material, and they were mixed and kneaded to prepare kneaded clay. As the hygroscopic resin, a material having two magnifications as a water absorption magnification and an average particle diameter of two μm after water absorption was used. Mixing and kneading were performed by a sigma kneader, and kneading using a vacuum clay kneader was further performed to obtain kneaded clay extruded into a cylindrical shape (70 mmφ).

The obtained kneaded clay was subjected to extrusion forming using a ram extrusion forming machine, thereby fabricating a honeycomb formed body having a square cell cross-sectional shape and a cylindrical entire shape.

Subsequently, the obtained honeycomb formed body was dried based on a combination of microwave drying and hot-air drying. It is to be noted that, e.g., a combination of a dielectric drying method and a hot-air drying method may be adopted.

Then, the dried honeycomb formed body was fired to obtain a honeycomb structure. As a firing condition, a maximum temperature was set to 1350 to 1440° C.

The obtained honeycomb structure had a diameter of 70 mm and a cylindrical shape having a length 100 mm in a central axis direction. In regard to a cell structure, a thickness of a partition wall was 150 μm (six milli-inches), a cell density was 930 kilo cells/square meter (600 cells/square inch), and an average pore diameter of the partition wall was six μm.

In the obtained honeycomb structure or a manufacturing process of a honeycomb structure, "a crack of a partition wall in forming", "an increase in extrusion pressure", "firing cut", "a variation in dimension", "a variation in porosity", "a compression strength", "an iso-strength", and "an average particle diameter ratio" were confirmed based on the following method. Table 2 shows results.

(Crack of Partition in Forming)

In regard to a crack of a partition wall in forming, the honeycomb dried article is visually confirmed. A situation where a crack of the partition wall is not present is determined as "absence" of a crack of the partition wall, and a situation where a crack of the partition wall is present is determined as "presence" of a crack of the partition wall.

(Increase in Extrusion Pressure)

In regard to an increase in extrusion pressure, presence/absence of n increase in extrusion pressure at the time of extrusion forming was confirmed with respect to a regular extrusion pressure. A case where an increase in pressure that is equal to or above 10% is observed with respect to a regular extrusion pressure is determined as "presence (large)", a case where an increase in pressure that is equal to or above five % and less than 10% is observed is determined as "presence (small)", and a case where an increase in pressure is not observed or an increase in pressure that is less than five % is observed is determined as "absence". The "regular extrusion pressure" means an extrusion pressure when a pore forming material such as solid particles, hollow particles, or a hygroscopic resin is not used.

(Firing Cut)

In regard to cease of firing, the honeycomb structure is visually confirmed. When a crack is not observed, this is determined as "absence" of firing cut. When a crack is observed, this is determined as "presence" of firing cut.

(Variation in Dimension)

As to a variation in dimension, a micrometer caliper is used to confirm the honeycomb structure (N=100). When a variation from an average value falls within a range of ±4 σ, this is determined as a "small" variation in dimension. When the same exceeds the range of ±4 σ, this is determined as a "large" variation in dimension. σ means a "standard deviation".

(Porosity)

A porosity was calculated from a total pore volume measured by a mercury penetration type porosimeter "Autopore 9500" manufactured by Micromeritics. At this time, an absolute specific gravity of cordierite was set to 2.52.

(Variation in Porosity)

A variation in porosity was determined as a variation of porosity measured from the honeycomb structure (N=100) that sufficiently satisfy specifications. A value falling within a range of ±1% with respect to an average value was determined as an acceptable value.

(Compression Strength)

As a compression strength, a cylindrical sample having a diameter of one inch (2.54 cm) and a length of one inch is cut out from the honeycomb structure, and a compression strength in a flow path direction (a direction along which cells are extended) is measured based on autograph. A sample was cut out and collected from a part having no defect, e.g., a crack of the partition wall or firing cut. A load cell was determined as 25 kN, and a weighting speed was determined as 0.5 mm/minute. A pressure strength equal to or above 10 MPa was acceptable when a thickness of the partition wall was 150 μm (six milli-inches) and a cell density was 930 kilo cells/square meter (600 cells/square inch). A compression strength equal to or above five MPa was acceptable when a thickness of the partition wall was 90 μm (3.5 milli-inches) and a cell density was 1395 kilo cells/square meter (900 cells/square inch).

(Isostatic (Iso) Strength)

The honeycomb structure was inserted into a flexible tube, an equal pressure based on a water pressure was applied, and a pressure that produced partial destruction was measured. Measurement results were relatively shown with a measured value of the honeycomb structure obtained in Example 1 being determined as 100. Since measurement of the isostatic strength is measured by using the entire honeycomb structure, presence/absence of a defect in the honeycomb structure and its frequency/degree also affects measurement results.

(Average Particle Diameter Ratio)

A ratio (A/B) of an average particle diameter (A) of the hygroscopic resin after water absorption with respect to an average particle diameter (B) of a component in the cordierite forming raw material whose average particle diameter exceeding 10 μm is calculated as an average particle diameter ratio. It is to be noted that a section of B (μm) in Table 2 shows an average particle diameter of each component having an average particle diameter exceeding 10 μm. For example, "14 (a silica)" represents that a component whose average particle diameter exceeds 10 μm is a silica and its average particle diameter is 14 μm. Further, when a plurality of components whose average particle diameters exceed 10 μm are present, the plurality of components are shown.

TABLE 1

| | Blending amount of hygroscopic resin (parts by weight) | Water absorption magnification | Average particle diameter after water absorption A (μm) | Blending amount of solid particle (parts by weight) | Blending amount of hollow particle (parts by weight) | Blending amount of water (parts by weight) | Average particle diameter of talc (μm) | Average particle diameter of kaolin (μm) | Average particle diameter of alumina source raw material (μm) | Average particle diameter of silica (μm) | Cell structure (mm)/(k cells/m²) |
|---|---|---|---|---|---|---|---|---|---|---|---|
| Example 1 | 0.01 | 2 | 2 | 0 | 0 | 33 | 10 | 6 | 2 | 4 | 0.15/930 |
| Example 2 | 0.1 | 2 | 200 | 0 | 0 | 41 | 9 | 3 | 0.1 | — | 0.15/930 |
| Example 3 | 0.2 | 5 | 11 | 0 | 0 | 37 | 10 | 6 | 2 | 4 | 0.15/930 |
| Example 4 | 1 | 10 | 32 | 0 | 0 | 40 | 9 | 2 | 5 | 14 | 0.15/930 |
| Example 5 | 6 | 30 | 40 | 0 | 0 | 88 | 11 | 3 | 0.1 | 3 | 0.15/930 |
| Example 6 | 0.05 | 3 | 5 | 0 | 0 | 38 | 25 | 5 | 6 | 4 | 0.15/930 |
| Example 7 | 0.1 | 100 | 200 | 0 | 0 | 90 | 10 | 20 | 1 | — | 0.15/930 |
| Example 8 | 0.01 | 5 | 160 | 0 | 0 | 36 | 10 | 5 | 10 | 3 | 0.15/930 |
| Example 9 | 0.01 | 50 | 100 | 0 | 0 | 34 | 10 | 5 | 0.1 | 20 | 0.15/930 |
| Example 10 | 1 | 10 | 32 | 0 | 0 | 40 | 3 | 0.2 | 2 | 4 | 0.15/930 |
| Example 11 | 18 | 3 | 150 | 0 | 0 | 50 | 9 | 2 | 5 | 14 | 0.15/930 |
| Example 12 | 0.1 | 100 | 200 | 0 | 0 | 90 | 10 | 11 | 1 | — | 0.15/930 |
| Example 13 | 0.2 | 5 | 11 | 0 | 0 | 37 | 10 | 6 | 2 | 4 | 0.09/1395 |
| Example 14 | 0.01 | 2 | 2 | 0 | 0 | 32 | 36 | 6 | 2 | 4 | 0.15/930 |
| Comparative Example 1 | 4 | 15 | 32 | 0 | 0 | 70 | 21 | 11 | 4 | 25 | 0.15/930 |
| Comparative Example 2 | 8 | 10 | 20 | 0 | 0 | 120 | 5 | 3 | 0.1 | 3 | 0.15/930 |
| Comparative Example 3 | 0 | — | — | 1 | 0 | 34 | 10 | 5 | 6 | 4 | 0.15/930 |
| Comparative Example 4 | 0 | — | — | 0 | 2 | 35 | 10 | 5 | 6 | 4 | 0.15/930 |
| Comparative Example 5 | 2 | 10 | 250 | 0 | 0 | 50 | 10 | 5 | 6 | 4 | 0.15/930 |
| Comparative Example 6 | 5 | 2 | 100 | 0 | 0 | 40 | 9 | 3 | 0.1 | — | 0.15/930 |
| Comparative Example 7 | 10 | 1.5 | 150 | 0 | 0 | 38 | 5 | 3 | 0.1 | — | 0.15/930 |
| Comparative Example 8 | 0.1 | 120 | 300 | 0 | 0 | 150 | 10 | 5 | 6 | 4 | 0.15/930 |
| Comparative Example 9 | 0.1 | 120 | 300 | 0 | 0 | 150 | 10 | 5 | 6 | 4 | 0.09/1395 |

TABLE 2

| | Crack of partition wall in forming | Increase in extrusion pressure | Firing Cut | Variation in dimension | Porosity (%) | Variation in porosity(%) | Compression strength (MPa) | Iso-strength | B (μm) | A/B |
|---|---|---|---|---|---|---|---|---|---|---|
| Example 1 | Absence | Absence | Absence | Small | 35 | 0.3 | 14 | 100 | — | — |
| Example 2 | Absence | Absence | Absence | Small | 11 | 0.5 | 21 | 120 | — | — |
| Example 3 | Absence | Absence | Absence | Small | 37 | 0.3 | 14 | 100 | — | — |
| Example 4 | Absence | Absence | Absence | Small | 32 | 1 | 15 | 100 | 14 (Silica) | 2.3 |
| Example 5 | Absence | Absence | Absence | Small | 38 | 0.8 | 13 | 100 | 11 (Talc) | 3.6 |
| Example 6 | Absence | Absence | Absence | Small | 39 | 0.7 | 13 | 100 | 20 (Talc) | 0.25 |
| Example 7 | Absence | Absence | Absence | Small | 36 | 0.3 | 14 | 100 | 20 (Kaolin) | 10.0 |
| Example 8 | Absence | Absence | Absence | Small | 39 | 0.2 | 13 | 100 | — | — |
| Example 9 | Absence | Absence | Absence | Small | 38 | 0.3 | 13 | 100 | 20 (Silica) | 5.0 |
| Example 10 | Absence | Absence | Absence | Small | 28 | 0.5 | 18 | 100 | — | — |
| Example 11 | Absence | Absence | Absence | Small | 35 | 0.2 | 15 | 100 | 14 (Silica) | 10.7 |
| Example 12 | Absence | Absence | Absence | Small | 32 | 0.3 | 15 | 100 | 11 (Kaolin) | 18.2 |
| Example 13 | Absence | Presence (small) | Absence | Small | 37 | 0.3 | 8 | 62 | — | — |
| Example 14 | Absence | Absence | Absence | Small | 39 | 0.8 | 14 | 100 | 35 (Talc) | 0.06 |
| Comparative Example 1 | Absence | Absence | Absence | Small | 65 | 0.5 | 6 | 80 | * | ** |
| Comparative Example 2 | Absence | Absence | Presence | Large | 45 | 0.7 | 11 | 65 | — | — |
| Comparative Example 3 | Presence | Presence (large) | Absence | Small | 37 | 0.8 | 14 | 70 | — | — |
| Comparative Example 4 | Absence | Absence | Absence | Small | 39 | 1.6 | 13 | 100 | — | — |
| Comparative Example 5 | Presence | Absence | Presence | Small | 49 | 2.5 | 10 | 60 | — | — |
| Comparative Example 6 | Absence | Presence (small) | Presence | Small | 25 | 0.3 | 17 | 72 | — | — |
| Comparative Example 7 | Absence | Presence (large) | Presence | Small | 39 | 0.8 | 13 | 58 | — | — |
| Comparative Example 8 | Presence | Absence | Presence | Large | 36 | 3.3 | 14 | 65 | — | — |
| Comparative Example 9 | Presence | Presence (large) | Presence | Large | 36 | 3.2 | 3 | 35 | — | — |

\* 21 (Talc), 11 (Kaolin), 25 (Silica)
\*\* 1.5 (Talc), 2.9 (Kaolin), 1.3 (Silica)

Examples 2 to 14

A honeycomb structure was fabricated like Example 1 except that a material having a water absorption magnification and an average particle diameter after water absorption shown in Table 1 was used as a hygroscopic resin, a blending amount of the hygroscopic resin and a blending amount of water shown in Table 1 were adopted, and talc, kaolin, an aluminum oxide, and a silica each having an average particle diameter depicted in Table 1 were used as components in a cordierite forming raw material to provide a cell structure shown in Table 1. It is to be noted that the silica is not blended in the cordierite raw material in Examples 2 and 7. Further, a section "Cell structure" in Table 1 shows "a thickness of a partition wall (mm)]/[a cell density (k cells/m$^2$)]. Here, "k cells" means "kilo cells".

In the obtained honeycomb structure or a manufacturing process of a honeycomb structure, "a crack of a partition wall in forming", "an increase in extrusion pressure", "firing cut", "a variation in dimension", "porosity", "a variation in porosity", "a compression strength", "an iso-strength", and "an average particle diameter ratio" were confirmed based on the above method. Table 2 shows results.

Comparative Examples 1, 2, and 5 to 9

A honeycomb structure was fabricated like Example 1 except that a material having a water absorption magnification and an average particle diameter after water absorption shown in Table 1 was used as a hygroscopic resin, a blending amount of the hygroscopic resin and a blending amount of water shown in Table 1 were adopted, and talc, kaolin, an aluminum oxide, and a silica each having an average particle diameter depicted in Table 1 were used as components in a cordierite forming raw material to provide a cell structure shown in Table 1. It is to be noted that the silica is not blended in the cordierite raw material in Comparative Examples 6 and 7.

In the obtained honeycomb structure or a manufacturing process of a honeycomb structure, "a crack of a partition wall in forming", "an increase in extrusion pressure", "firing cut", "a variation in dimension", "porosity", "a variation in porosity", "a compression strength", "an iso-strength", and "an average particle diameter ratio" were confirmed based on the above method. Table 2 shows results.

Comparative Example 3

A honeycomb structure was fabricated like Example 1 except that solid particles were used in place of the hygroscopic resin, a blending amount of the solid particles and a blending amount of water shown in Table 1 were adopted, and talc, kaolin, an aluminum oxide, and a silica each having an average particle diameter depicted in Table 1 were used as components in a cordierite forming raw material. As the solid particles, PMMA (a methyl methacrylate resin) having an average particle diameter of 30 μm was used.

In the obtained honeycomb structure or a manufacturing process of a honeycomb structure, "a crack of a partition wall in forming", "an increase in extrusion pressure", "firing cut", "a variation in dimension", "porosity", "a variation in porosity", "a compression strength", "an iso-strength", and "an average particle diameter ratio" were confirmed based on the above method. Table 2 shows results.

Comparative Example 4

A honeycomb structure was fabricated like Example 1 except that hollow particles were used in place of the hygroscopic resin, a blending amount of the hollow particles and a blending amount of water shown in Table 1 were adopted, and talc, kaolin, an aluminum oxide, and a silica each having an average particle diameter depicted in Table 1 were used as components in a cordierite forming raw material. As the hollow particles, a resin balloon having an average particle diameter of 50 μm was used.

In the obtained honeycomb structure or a manufacturing process of a honeycomb structure, "a crack of a partition wall in forming", "an increase in extrusion pressure", "firing cut", "a variation in dimension", "porosity", "a variation in porosity", "a compression strength", "an iso-strength", and "an average particle diameter ratio" were confirmed based on the above method. Table 2 shows results.

It can be understood from Tables 1 and 2 that a crack of the partition wall in forming, an increase in extrusion pressure, and firing cut did not occur in the manufacturing method of a honeycomb structure according to each of Examples 1 to 12. In the manufacturing method of a honeycomb structure according to Example 13, although an extrusion pressure was slightly increased, it is very small as compared with Comparative Example 9 having the same structure (the same slit structure of a die for extrusion forming), and hence there was substantially no problem. Moreover, it can be understood that a porosity was equal to or below 40%, both a variation in dimension and a variation in porosity were small, and high values of a compression strength and an iso-strength were maintained in the manufacturing method of a honeycomb structure according to each of Examples 1 to 14.

The manufacturing method of a honeycomb structure according to the present invention can be utilized for manufacture of a honeycomb structure that is used to adsorb/absorb, e.g., NOx, CO, HC, and others contained in an exhaust gas from an automobile by a carried catalyst or the like.

What is claimed is:

1. A manufacturing method of a honeycomb structure, comprising:
    forming kneaded clay containing a cordierite forming raw material that contains talc having an average particle diameter of 0.1 to 40 μm, kaolin having an average particle diameter of 0.1 to 20 μm, and an alumina source raw material having an average particle diameter of 0.05 to 10 μm, a binder, a surface active agent, water, and a hygroscopic resin having an average particle diameter of two to 200 μm after water absorption and a water absorption magnification of two to 100 magnifications into honeycomb shape to obtain a honeycomb formed body; and
    firing the honeycomb formed body to obtain a honeycomb structure whose porosity is less than 40%,
    wherein the kneaded clay contains 0.01 to 1 part by weight of the hygroscopic resin with respect to 100 parts by weight of the cordierite forming raw material.

2. The manufacturing method of a honeycomb structure according to claim 1, wherein a thickness of a partition wall in the honeycomb structure is 35 to 260 μm.

3. The manufacturing method of a honeycomb structure according to claim 1, wherein the average particle diameter of the hygroscopic resin after water absorption is equal to or below 90% of the thickness of the partition wall in the honeycomb structure.

4. The manufacturing method of a honeycomb structure according to claim 1, wherein the average particle diameter of the hygroscopic resin after water absorption is 0.1 to 20-fold of an average particle diameter of at least one of components in the cordierite forming raw material having average particle diameters exceeding 10 μm.

5. The manufacturing method of a honeycomb structure according to claim 2, wherein the cordierite forming raw material further contains a silica having an average particle diameter of 0.1 to 20 μm.

* * * * *